United States Patent Office 2,880,083
Patented Mar. 31, 1959

2,880,083

METHOD OF PRODUCING SPONGE IRON

Fritz O. Wienert, Niagara Falls, N.Y., assignor, by mesne assignments, to R-N Corporation, New York, N.Y., a corporation of Delaware No Drawing. Application May 6, 1954
Serial No. 428,135

6 Claims. (Cl. 75—33)

This invention relates to improvements in the production and use of sponge iron. More specifically it relates to an improved process for efficient removal of the sulphur content of the fuel used in reducing the iron-bearing material and for subsequent recovery of an improved sponge iron product.

The production of sponge iron is now a definite technical accomplishment. It can be produced in quantity by heating a mixture of oxides of iron and solid fuel in a rotary kiln. In its passage through the kiln, the coal is charred and is partly used for reduction and partly used for combustion, the excess char produced being returned to the feed to replace an equivalent amount of coal.

Although the production of sponge iron is a definite technical accomplishment, the methods used are wasteful in regard to consumption of fuel. Moreover, the grade and composition of the iron as far as impurities are concerned falls far short of what is desirable.

It is the main purpose of this invention to overcome or at any rate considerably reduce the disadvantages referred to so as to make processes for the production of sponge iron economically attractive.

An object of this invention is to provide a process for preventing sulphur from entering sponge iron during the production of same. Another object is to provide a method for processing a sponge iron produc tuncontaminated with sulphur wherein a maximum quantity of iron may be recovered. These and other objects will become obvious from the following more complete description of the instant invention:

It has been proposed to add limestone or dolomite to the charge, i.e., the mixture of iron oxide and fuel, the function of such material being to combine with the sulphur content of the fuel, and thus to prevent sulphur from entering the sponge iron, which it would otherwise do. Although the addition of limestone or dolomite has been found effective to some extent, it has now been found according to the instant invention that even better results are obtained by the inclusion of burnt lime or even hydrated lime to the charge. This results in an even more efficient removal of the sulphur because volatile sulphur compounds begin to form out of the fuel before calcium carbonate dissociates into the more active oxides. Although burnt or hydrated lime is partly converted to the carbonate if added to the charge, such precipitated carbonate has been found to be more active than the natural material.

Broadly the instant invention is directed to the step in a process for the production of sponge iron by reducing iron containing ore with solid fuel which comprises coating the fuel with a compound selected from the group consisting of calcium and magnesium oxides, hydroxides, carbonates and mixtures thereof.

In practice, one difficulty in the production of sponge iron when limestone is used for the combination with sulphur from the fuel, is that fine lime and the calcium sulphide formed from it tend to adhere to the sponge iron, thus increasing its sulphur content. For this reason, the fine material has previously been removed from the limestone or dolomite before mixing with the feed.

Another process to avoid the disadvantages referred to has been to char the coal in the presence of lime prior to the production of sponge iron. This however obviously results in the loss of the volatile matter and is therefore not economical.

According to the present process, the fuel is pre-coated with a compound of calcium or magnesium or mixtures thereof before it is fed into the kiln. This pre-coating can be done if the fuel is moist or damp or by the addition of water. It is found the material, particularly the fines, adheres satisfactorily to the coal or char. This adhesion can be improved further by the use of a binder like tar, glue, waterglass, clay and the like which substances may be employed in solution form, as emulsions or suspensions. The use of this pre-coated material effects a considerable improvement. If large sized lime is used, it is found that there is abrasion of the grains during the rotation of the kiln with the production of secondary fines which when sulphidised will adhere to the sponge iron. This drawback is overcome by the agitation of the large sized lime or limestone or dolomite before the materials are added to the kiln. The agitation being done in the presence of moist fuel, the fine lime will coat the coal and combine with the sulphur from the fuel, and not being in the form of free fines, cannot adhere to the sponge iron and therefore will not increase its sulphur content by adhesion.

It has further been found that the recovery of pure sponge iron may be facilitated by subjecting the discharge feed material which is obtained after the reduction step to a combined comminuting and attrition operation. This operation may be carried out in known apparatus such as rotary drums, hammer mills and the like. The combined action of attrition and comminuting results in a two-fold accomplishment; one, the sulphur content of the sponge iron product is reduced and two, the contamination of gangue such as siliceous material is considerably lessened.

It has been found when the combined comminuting and attrition operation is interrupted so as to periodically remove the fines which are formed that an improved product results. Likewise, the passage of a gentle stream of air through the attrition or grinding apparatus has been found to be effective in removing the fines. For instance, a sponge iron product having 0.11% sulphur and containing 6.2% $SiO_2$ when treated according to the combined operation of this invention and subsequently magnetically separated, was found to contain only 1.3% silica and 0.04% sulphur.

It will be appreciated that to obtain a low sulphur content, it is necessary to have an excess of lime, and that such excess, not being magnetic, is returned with the excess char to the feed of the kiln. However, a part of this material must be bled off and replaced by fresh lime, and this in a normal way would result in the wastage of a corresponding amount of char. To obviate this, the fuel used is sized to a coarse sizing, that is, for example to minus three mesh and the lime to a finer screening, say minus twenty mesh. After magnetic separation, the kiln discharge gives a tailing consisting of lime and char, and if this is passed over a twenty mesh screen, the sulphidised lime will be removed by passing through the screen, and the coarser material will be char, which is returned to the furnace.

In melting the sponge iron, the straight out procedure would result in a substantial loss of iron in the slag, because there is still a certain amount of unreduced oxide of iron which will combine with silica. This is avoided by the addition and mixture of fine limestone or lime and solid fuel with the sponge iron before melting. Obviously the calcium compound should be sulphur free. This causes reduction of the residual iron oxide and the formation of a silicate which consists essentially of calcium silicate and not iron silicate, as would result from the normal addition of lumpy lime and carbon.

In some uses of sponge iron, particularly for furnace cupolas, it is necessary to form it into briquettes. To do this it has been found that a pressure of about twenty tons and more per square inch gives hard briquettes without the use of a binder.

It has further been found that finely divided calcium compounds, either carbonate, oxide or hydrate, can be mixed with granular sponge iron and formed into suitable briquettes, although these containing the oxide must be used within twenty-four hours, as they disintegrate if kept for long periods. Also, the use of a certain amount of fuel in the briquette mixture will give a suitable briquette, and further it has been found that the briquettes containing lime and/or suitable carbon do not disintegrate in the furnace provided they are not heated too rapidly.

The procedure of this invention is illustrated by the following example:

Coal is crushed to a particle size which will pass through a three mesh screen and moistened with water. It is then mixed with lime of minus twenty mesh particle size in a suitable agitator, the lime being used in an amount which exceeds the stoichiometric requirement for combination with the sulphur content of the coal. Agitation of the mixture is continued until the fine lime particles coat the moistened coal. The agitation produces secondary fines by abrasion of the coarser of the lime particles, these fines being particularly adherent to the coal. The lime-coated coal is then introduced into a rotary kiln with iron ore suitable for production of sponge iron and the mixture is heated according to conventional procedure to cause reduction of the iron oxide of the ore.

The sponge iron product resulting from the reduction is discharged from the kiln and the sponge iron is magnetically separated from the other constituents of the kiln product. The non-magnetic fraction, consisting mainly of carbon and fine particles of sulphidized lime, is passed over a twenty mesh screen. The material remaining on the screen is essentially carbon which is recycled for further reduction.

The magnetic portion of the kiln product, which in a typical case may contain 0.11% sulphur and 6.2% silica, is purified by subjecting it to a comminuting and attrition operation in a hammer mill through which a gentle stream of air is passed to remove the fines. The remainder of the mill charge is subjected to magnetic separation to give a granular sponge iron which may contain as little as 1.3% silica and 0.04% sulphur.

For further use the purified sponge iron powder thus obtained is mixed with fine, sulphur-free, burned lime and carbon and briquetted, preferably under about twenty tons per square inch pressure. The hard briquettes resulting are then charged to a cupola for melting. As a result of the use of the lime and carbon in the briquettes the residual iron oxide of the sponge iron product is reduced and the yield of iron is increased.

From the foregoing it is evident that the instant invention provides practical methods for improving the efficiency of processes for reducing iron containing materials. Further by the practice of the invention as described it is possible to obtain a purified sponge iron and melts thereof. The invention however is not intended strictly to be limited to the description as herein set forth, but other modifications and variations may be employed within the scope of the following claims.

I claim:

1. In a process for producing sponge iron by reducing iron-containing ore with solid fuel the improvement which comprises coating moistened fuel with a finely divided compound selected from the group consisting of calcium and magnesium oxides, hydroxides, carbonates, and mixtures thereof in the absence of the iron containing ore and subsequently, without preliminary heating of said coated fuel, mixing said coated fuel with said ore and reducing said ore by heating said mixture of coated fuel and ore at elevated temperatures to form a sponge iron product.

2. A process as set forth in claim 1 in which said fuel is in the form of discrete particles sized to approximately minus three mesh and said compound is in the form of discrete particles sized to approximately minus twenty mesh.

3. In a process for producing sponge iron by reducing iron containing ore with solid fuel the improvement which comprises moistening the fuel with water, mixing therewith a compound selected from the group consisting of calcium and magnesium oxides, hydroxides, carbonates and mixtures thereof, and agitating the mixed fuel and compound, thereby to cause abrasion of said compound and to coat the moistened fuel with fine particles thereof, and subsequently, without preliminary heating of the coated fuel, mixing said coated fuel with said ore and reducing said ore by heating said mixture of coated fuel and ore at elevated temperatures to form a sponge iron product, the moistening of said fuel and the mixing and agitation of said fuel and compound being carried out in the absence of the iron-containing core.

4. A process as set forth in claim 2 in which sponge iron is magnetically separated from other constituents of said product and said other constituents are screened to produce a charred-fuel fraction and a sulphidized fraction including sulphides and oxides of elements selected from the group consisting of magnesium and calcium, the charred-fuel fraction being of larger particle size than the sulphidized fraction.

5. A process as set forth in claim 1 which comprises the additional steps of separating the sponge iron in said product from gangue and other constituents, mixing said separated sponge iron with a sulphur-free calcium compound and melting the resulting mixture.

6. A process as set forth in claim 5 in which solid fuel is also mixed with said separated sponge iron before melting.

References Cited in the file of this patent

UNITED STATES PATENTS

| | | |
|---|---|---|
| 2,028,105 | Head | Jan. 14, 1936 |
| 2,380,406 | Buehl | July 31, 1945 |
| 2,603,423 | Buehl | July 15, 1952 |
| 2,684,296 | Moklebust | July 20, 1954 |